D. B. MORISON.
APPARATUS FOR FILTERING LIQUIDS.
APPLICATION FILED FEB. 8, 1918.
1,312,041.
Patented Aug. 5, 1919.
2 SHEETS—SHEET 1.
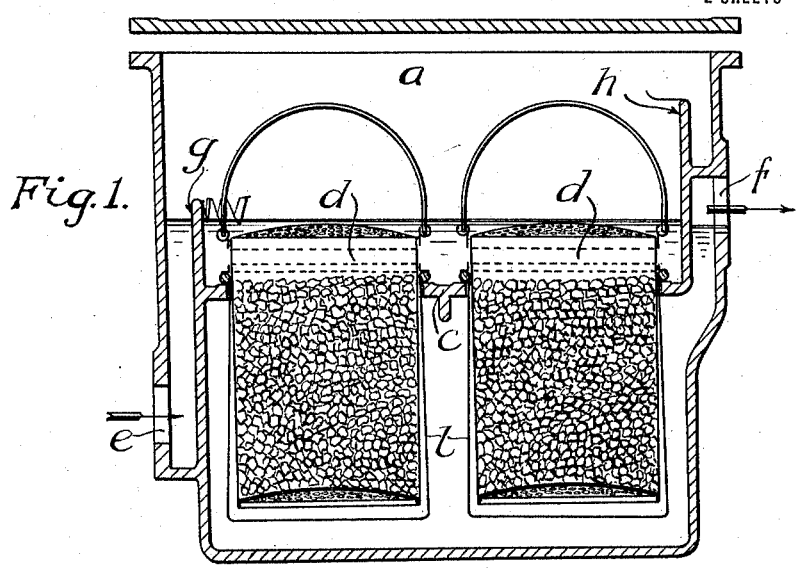
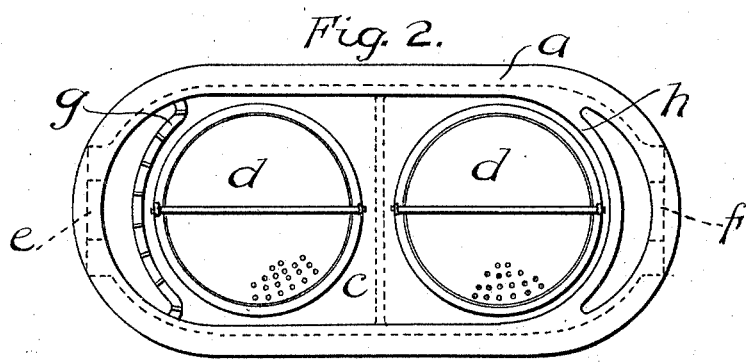
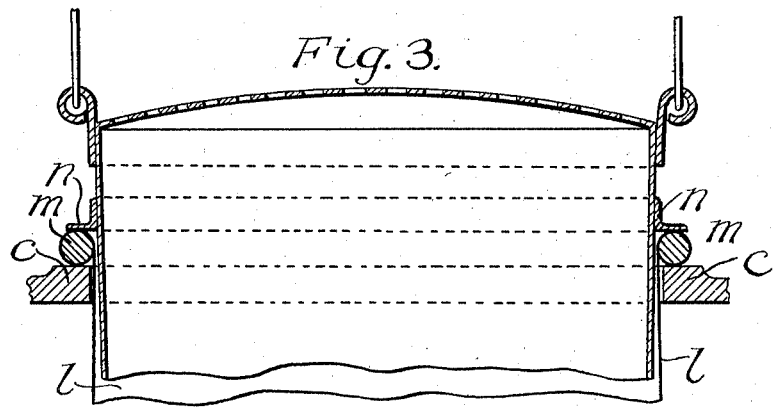
Inventor:
Donald Barns Morison,
by *Attys.*

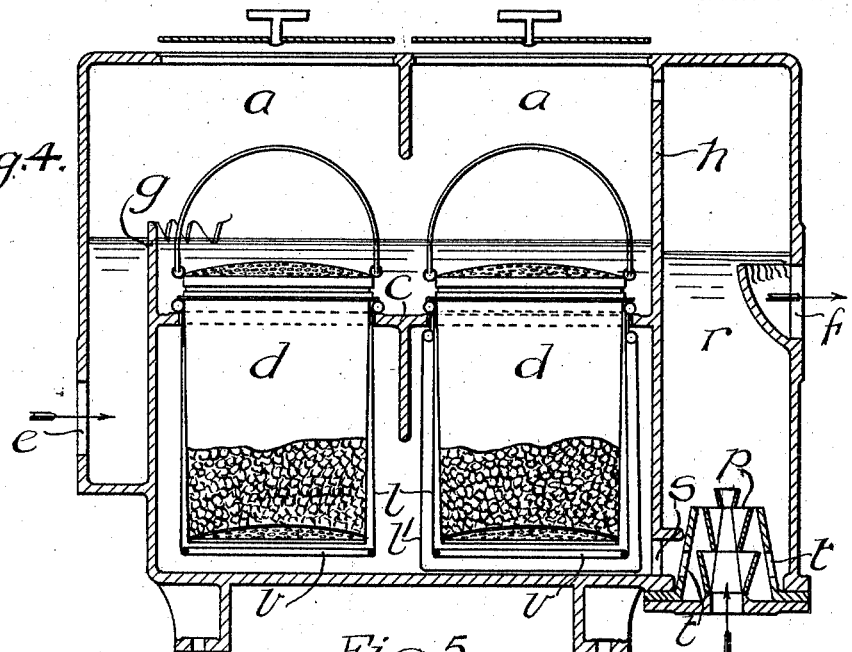

UNITED STATES PATENT OFFICE.

DONALD BARNS MORISON, OF HARTLEPOOL, ENGLAND.

APPARATUS FOR FILTERING LIQUIDS.

1,312,041. Specification of Letters Patent. Patented Aug. 5, 1919.

Application filed February 8, 1918. Serial No. 216,097.

*To all whom it may concern:*

Be it known that I, DONALD BARNS MORISON, a subject of the King of Great Britain and Ireland, residing at Hartlepool, in the county of Durham, England, have invented the Improvements in Apparatus for Filtering Liquids, of which the following is a specification.

This invention relates to filtering apparatus of the kind wherein filtering material is contained in vessels through which the liquid to be cleansed is caused to flow. My invention is particularly suitable for use on shipboard as an independent unit or in combination with apparatus of the kind described in the specification of Patent No. 1163436 of 1915.

When filtering apparatus of the kind referred to is used for the filtration of feed water on shipboard, I have found from prolonged experience that washed coke is very successful as a filtering medium, but if, and when, there is much movement, such as may be caused by the rolling of the ship; small particles of coke may become detached and pass away with the cleansed water.

The object of my present invention is to provide improved filtering apparatus of the kind referred to, whereby small particles which become separated from the filtering material are prevented from leaving the apparatus. The apparatus may also provide for the more efficient filtration and heating of the liquid.

In accordance with my invention, I cause the liquid, after passing through a filtering vessel, to flow through a strainer constructed of textile fabric, or of fine wire gauze or other suitable material, which envelop the outlet from the filter vessel, or is arranged between the filtering vessel and the outlet from the filtering compartment, or the outlet from the apparatus. When the filtering material is contained in one or more vessels in the form of portable buckets, or the like, as described in the specification of Patent No. 1163436 of 1915 in which perforated buckets are supported in circular holes in a horizontal plate by a ring or ledge attached to each bucket and resting on the horizontal plate, I may provide each bucket with a bag or envelop of canvas or other suitable material, which covers that part of the bucket which extends below the horizontal plate, so that any particles which may pass through the perforations in the bucket are caught in the bag or envelop and prevented from leaving the apparatus. As the entire surface of the bag is available for the passage of the liquid therethrough, the mesh may be so fine as not only to catch possible detached particles, but to provide in itself an effective filtering medium.

The bottom or base of the bag or envelop may be more closely woven or of finer mesh than the sides, so as to effectively retain any fine particles of the filtering material which may fall through the perforations in the bucket. The bag may be independent of the bucket, or attached thereto, but I prefer to use an independent bag which is larger in diameter than the diameter of the bucket, and provide at its open end means for making a suitable joint, as by an incased ring of rope which may rest on the upper surface of the horizontal supporting plate, and between such plate and a ring or ledge attached to the outer circumference of the bucket. Or the upper part of the bag may be simply tied around the circumference of the bucket above or below the supporting plate.

A convenient form of apparatus in accordance with my invention consists of a single compartment tank containing perforated filtering buckets supported by a horizontal plate in the manner described in the specification of Patent No. 1163436 of 1915; the inlet and outlet passages, and a weir or weirs, being so arranged that a depth of water is always maintained above the buckets for the collection of float oil or the like, the passage of the water through the buckets being in a downward direction. That part of each bucket which extends below the supporting plate is covered by a bag of canvas or other suitable material, the edge of the open end of the bag having an incased ring of rope which rests on the upper surface of the horizontal plate in the manner hereinbefore described. Such an apparatus is simple in design, highly efficient, and easily washed.

Although I have referred to the use of one strainer or bag in combination with each filtering bucket or vessel, I may employ two or more strainers, and when they are in the form of bags or envelops, they may be concentrically arranged around the filtering vessel, and supported in any convenient manner. For example, the upper edge of the outer bag or bags may be held between the upper edge of the inner bag and a horizontal supporting plate. The concentric bags may be separated by a ring of rope, or other suitable material, placed between the outer circumference of one bag and the inner circumference of another bag.

The tank containing the filtering apparatus may also contain a steam heating nozzle, which may be placed in a separate compartment or passage, and preferably arranged to heat the cleansed liquid on its way to the outlet from the tank.

In the accompanying drawings, Figures 1 and 4 show sectional side elevations of two arrangements of apparatus embodying the invention; Fig. 2 is a plan view of the apparatus shown in Fig. 1, and Fig. 5 is a sectional plan view of the apparatus shown in Fig. 4.

Fig. 3 is an enlarged sectional side elevation through one of the filtering devices shown in Fig. 1, and illustrates the method of supporting the filter bag. Fig. 6 is an enlarged part section of the arrangement provided for supporting the concentric filter bags shown around the right-hand side filtering bucket in Fig. 4, and Fig. 7 is a modification of Fig. 6, and shows an alternative way of supporting concentrically arranged filter bags.

In all the figures, the same letters of reference are used to denote similar parts.

In the example shown in Figs. 1 and 2, the apparatus consists of a single compartment tank $a$ containing perforated filtering buckets $d$ supported by a horizontal plate $c$ in the manner described in the specification of Patent No. 1163436 of 1915. The inlet and outlet passages $e, f$ are so placed in relation respectively to the partitions or weirs $g$ and $h$, that a depth of water is always maintained above the buckets $d$ for the collection of float oil or the like, the passage of the water through the buckets being in a downward direction. That part of each bucket $d$ which extends below the supporting plate $c$ is covered with a strainer $l$ which may be constructed of textile fabric, such as canvas, or of fine wire gauze or other suitable material, the edge of the open end of the bag having an incased ring of rope $m$ (see Fig. 3), which is held between the ring $n$ and the upper surface of the horizontal plate $c$. The liquid passes through the apparatus as indicated by the arrows.

The apparatus shown in Figs. 4 and 5 is a modification of the apparatus shown in Figs. 1 and 2, and comprises a heating nozzle $p$ of the steam injector type arranged in the outlet passage or compartment $r$. As this nozzle forms no part of the present invention it is shown only in a conventional manner. In this arrangement the left-hand bucket is fitted with a single bag $l$ similar to that shown in Figs. 1 and 2, but the right-hand bucket is provided with two bags $l$ and $l'$ concentrically arranged around the bucket, the means for securing or hanging the bags being illustrated in the enlarged view in Fig. 6, from which it will be seen that the inner bag $l$ has an incased ring $m$ which rests upon the upper edge of the outer bag $l'$ which is also provided with an incased ring $m'$ below the supporting plate $c$, for the purpose of separating one bag from the other. After the liquid has passed through the filter buckets $d$ and the filter bags, $l$ and $l'$, it flows through the ports $s$, and preferentially through ports $t$ into the heating nozzle $p$, by which it is heated and circulated in the passage or compartment $r$, the nozzle $p$ being of similar construction to that shown in the specification of application Serial No. 181602 of 1917.

In order that the bags $l$ may hang well, weights, such as metal rings $v$ may be placed in the interior of the bags as shown, these rings being preferably split so that they can be easily removed.

Instead of supporting the filter bags $l$ and $l'$ by holding them between the ring $n$ and the supporting plate $c$, such bags may be carried upwardly over the ring $n$ and tied to the filter bucket $d$ by cords $o$ as shown in Fig. 7. The upper portion of the tank may be covered by one or more doors, the use of separate circular doors or covers, as shown in Fig. 4, being particularly convenient.

What I claim is:—

1. Apparatus for filtering liquids comprising a tank having a liquid inlet and outlet, a horizontal plate interposed between said inlet and outlet and having a hole therein, a bucket having a perforate top and bottom and containing filtering material, and a strainer bag inclosing the portion of the bucket below said plate and extended up between the edge of the hole and bucket wall and clamped in position by the pressure of the bucket.

2. In apparatus for filtering liquids comprising a portable filtering bucket perforated at the top and bottom and resting in a hole in a supporting plate, the combination therewith of a bag of textile material so arranged as to envelop the lower part of said bucket, the upper edge of the bag extending upwardly through the hole in the supporting plate and terminating in an incased ring of rope which is held between the supporting plate and a ring attached to the circumference of said bucket.

Signed at London, England, this fifth day of January, 1918.

DONALD BARNS MORISON.

Witnesses:
HENRY FOTHERGILL,
WILLIAM J. GUTHRIE.